(12) United States Patent
Ahn et al.

(10) Patent No.: US 10,948,777 B2
(45) Date of Patent: Mar. 16, 2021

(54) DISPLAY APPARATUS AND METHOD OF MANUFACTURING THE SAME

(71) Applicant: Samsung Display Co., LTD., Yongin-si (KR)

(72) Inventors: Jeaheon Ahn, Cheonan-si (KR); Jang-Il Kim, Asan-si (KR); Jeongki Kim, Hwaseong-si (KR); Jong-Hoon Kim, Seoul (KR); Cheonjae Maeng, Suwon-si (KR); Dongil Son, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/234,583

(22) Filed: Dec. 28, 2018

(65) Prior Publication Data
US 2019/0227385 A1 Jul. 25, 2019

(30) Foreign Application Priority Data

Jan. 23, 2018 (KR) .................. 10-2018-0008373

(51) Int. Cl.
| | | |
|---|---|---|
| G02F 1/13357 | (2006.01) | |
| G02F 1/1368 | (2006.01) | |
| G02F 1/1345 | (2006.01) | |
| G02F 1/1362 | (2006.01) | |
| G02F 1/1335 | (2006.01) | |
| G02F 1/1343 | (2006.01) | |
| G02F 1/1339 | (2006.01) | |

(52) U.S. Cl.
CPC ...... *G02F 1/133617* (2013.01); *G02F 1/1368* (2013.01); *G02F 1/13454* (2013.01); *G02F 1/133509* (2013.01); *G02F 1/133516* (2013.01); *G02F 1/133528* (2013.01); *G02F 1/136209* (2013.01); *G02F 1/13394* (2013.01); *G02F 1/13439* (2013.01); *G02F 2001/133548* (2013.01); *G02F 2001/136222* (2013.01)

(58) Field of Classification Search
None
See application file for complete search history.

(56) References Cited

U.S. PATENT DOCUMENTS 7,977,863 B2 * 7/2011 Matsueda ............. G02F 1/1341
313/504
9,995,958 B2 6/2018 Park et al.
(Continued)

FOREIGN PATENT DOCUMENTS

KR 10-0936891 1/2010
KR 10-2013-0104862 9/2013

*Primary Examiner* — Ryan Crockett
(74) *Attorney, Agent, or Firm* — H.C. Park & Associates, PLC

(57) ABSTRACT

A display apparatus including a first base substrate, a second base substrate facing the first base substrate, and a liquid crystal layer disposed between the first base substrate and the second base substrate. In a peripheral area, which is a non-display area adjacent to the display area, the display apparatus includes a gate driving thin film transistor disposed on a first base substrate, a light blocking pattern disposed on the second base substrate and overlapping the gate driving thin film transistor, a blue light blocking pattern disposed on the light blocking pattern, and a blue light passing pattern disposed on the blue light blocking pattern.

14 Claims, 8 Drawing Sheets

(56) References Cited

U.S. PATENT DOCUMENTS

| | | | |
|---|---|---|---|
| 2001/0025958 A1* | 10/2001 | Yamazaki | G02F 1/13454 |
| | | | 257/72 |
| 2015/0316814 A1* | 11/2015 | Nishiki | H01L 27/1225 |
| | | | 349/42 |
| 2016/0033823 A1* | 2/2016 | Lee | G02F 1/133617 |
| | | | 349/71 |
| 2016/0306226 A1* | 10/2016 | Yoon | G02F 1/133377 |
| 2017/0082892 A1* | 3/2017 | Chung | G02F 1/133514 |
| 2017/0131601 A1* | 5/2017 | Jiang | G02F 1/133514 |
| 2017/0227813 A1* | 8/2017 | Park | G02F 2/02 |
| 2018/0188590 A1* | 7/2018 | Gu | G02F 1/133504 |
| 2018/0284535 A1* | 10/2018 | Li | G02F 1/133528 |
| 2019/0185743 A1* | 6/2019 | Kim | C09K 11/703 |
| 2019/0391418 A1* | 12/2019 | Yamaguchi | C08L 33/14 |

* cited by examiner

DISPLAY APPARATUS AND METHOD OF MANUFACTURING THE SAME

CROSS REFERENCE TO RELATED APPLICATION

This application claims priority from and the benefit of Korean Patent Application No. 10-2018-0008373, filed on Jan. 23, 2018, which is hereby incorporated by reference for all purposes as if fully set forth herein.

BACKGROUND

Field

Exemplary embodiments of the invention relate generally to a display apparatus and a method of manufacturing the display apparatus and, more specifically, to a display apparatus using photoluminescence and a method of manufacturing the display apparatus.

Discussion of the Background

Recently, a display apparatus having light weight and small size has been manufactured. A cathode ray tube (CRT) display apparatus has been used as a result of having good performance and a competitive price. However, the CRT display apparatus suffers from disadvantages in having a large size and lack of portability. Therefore, various other types of display apparatuses, such as a plasma display apparatus, a liquid crystal display apparatus, and an organic light emitting display apparatus, have been highly regarded due to small size, light weight, and low power consumption.

The display apparatus may includes a color conversion structure using photoluminescence for converting colors of light, such as a quantum dot. A desired color can be imparted to the image by the color conversion structure. Thus, color reproducibility of the image and luminous efficiency can be improved such that display quality can be improved. However, the unique color conversion structure of the display apparatus causes various problems, such as deterioration in driving properties and defects in the manufacturing process.

The above information disclosed in this Background section is only for understanding of the background of the inventive concepts, and, therefore, it may contain information that does not constitute prior art.

SUMMARY

Exemplary embodiments of the inventive concepts provide a display apparatus capable of improving light efficiency and reducing driving property degradation, and a method of manufacturing the apparatus.

Additional features of the inventive concepts will be set forth in the description which follows, and in part will be apparent from the description, or may be learned by practice of the inventive concepts.

An exemplary embodiment of the inventive concepts provide a display apparatus including a first base substrate, a second base substrate facing the first base substrate, and a liquid crystal layer disposed between the first base substrate and the second base substrate. In a display area in which an image is displayed, the display apparatus includes first, second, and third thin film transistors disposed on the first base substrate; first, second, and third pixel electrodes disposed on the first base substrate and electrically connected to the first, second, and third thin film transistors, respectively; a light blocking pattern disposed on the second base substrate and having openings which overlap the first to third pixel electrodes; a blue light blocking pattern disposed on the second base substrate and overlapping the first and second pixel electrodes; and first and second color conversion patterns disposed on the blue light blocking pattern and overlapped with the first and second pixel electrodes, respectively. In a peripheral area, which is a non-display area adjacent to the display area, the display apparatus includes a gate driving thin film transistor disposed on the first base substrate, the light blocking pattern disposed on the second base substrate and overlapping the gate driving thin film transistor, the blue light blocking pattern disposed on the light blocking pattern, and a blue light passing pattern disposed on the blue light blocking pattern.

The light blocking pattern may include metal.

The light blocking pattern may include a first layer disposed on the second base substrate and a second layer disposed on the first layer. The first layer may be disposed between the second layer and the second base substrate. A reflectance of the second layer may be greater than that of the first layer.

The display apparatus may further include a backlight unit disposed under the first base substrate to provide a blue light in a direction toward the liquid crystal layer.

The blue light passing pattern may be a transparent pattern or a blue color conversion pattern which changes light passing therethough to blue light. The first color conversion pattern may include red quantum dot particles and/or red phosphor which changes light passing therethough to red light. The second color conversion pattern may include green quantum dot particles and/or green phosphor which changes light passing therethough to green light.

In the peripheral area, the display apparatus may further include the first color conversion pattern disposed on the blue light blocking pattern, and the second color conversion pattern disposed on the blue light blocking pattern.

The blue light blocking pattern may overlap the gate driving thin film transistor in the peripheral area.

The display apparatus may further include a lower light blocking pattern disposed on the first base substrate. The lower light blocking pattern may overlap the gate driving thin film transistor in the peripheral area.

The lower light blocking pattern may overlap the first to third thin film transistors in the display area.

The lower light blocking pattern may be red or green photoresist.

The blue light blocking pattern may be yellow color filter.

The blue light blocking pattern may include positive-type photoresist.

The gate driving thin film transistor and the first to third thin film transistors may be formed from the same layer.

The display apparatus may further include a light recycling filter disposed between the first color conversion pattern and the liquid crystal layer, between the second color conversion pattern and the liquid crystal layer, and between the blue light passing pattern and the liquid crystal layer.

The display apparatus may further include a wire grid polarizer disposed between the light recycling filter and the liquid crystal layer.

Another exemplary embodiment of the inventive concepts provide a method of manufacturing a display apparatus including forming a light blocking pattern on a mother base substrate having a first cell region and a second cell region, forming a blue light blocking pattern in the first cell region, the second cell region, and a region between the first cell region and the second cell region on the mother base substrate on which the light blocking pattern is formed, forming a first color conversion pattern, a second color conversion pattern on the blue light blocking pattern, and cutting the region between the first cell region and the second cell region to separate the first cell region and the second cell region.

The method may further include forming a lower substrate which includes a thin film transistor and corresponds to each of the first cell region and the second cell region, and forming a liquid crystal layer between the mother base substrate and the lower substrate in the first and second cell regions.

The display apparatus may include a display area in which an image is displayed, and a peripheral area which is a non-display area adjacent to the display area. The lower substrate may include a first base substrate. In the peripheral area, the upper substrate may include a gate driving thin film transistor disposed on the first base substrate of the lower substrate, a light blocking pattern overlapping the gate driving thin film transistor and disposed on a second base substrate which is a portion of the mother base substrate, a blue light blocking pattern disposed on the light blocking pattern, and a blue light passing pattern disposed on the blue light blocking pattern.

The method may further include forming a blue light passing pattern on the blue light blocking pattern, and forming a light recycling filter on the blue light blocking pattern, the first and second color conversion pattern, and the blue light passing pattern after forming the first and second color conversion pattern.

The first color conversion pattern may include red quantum dot particles and/or red phosphor which changes light passing therethough to red light. The second color conversion pattern may include green quantum dot particles and/or green phosphor which changes light passing therethough to green light.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
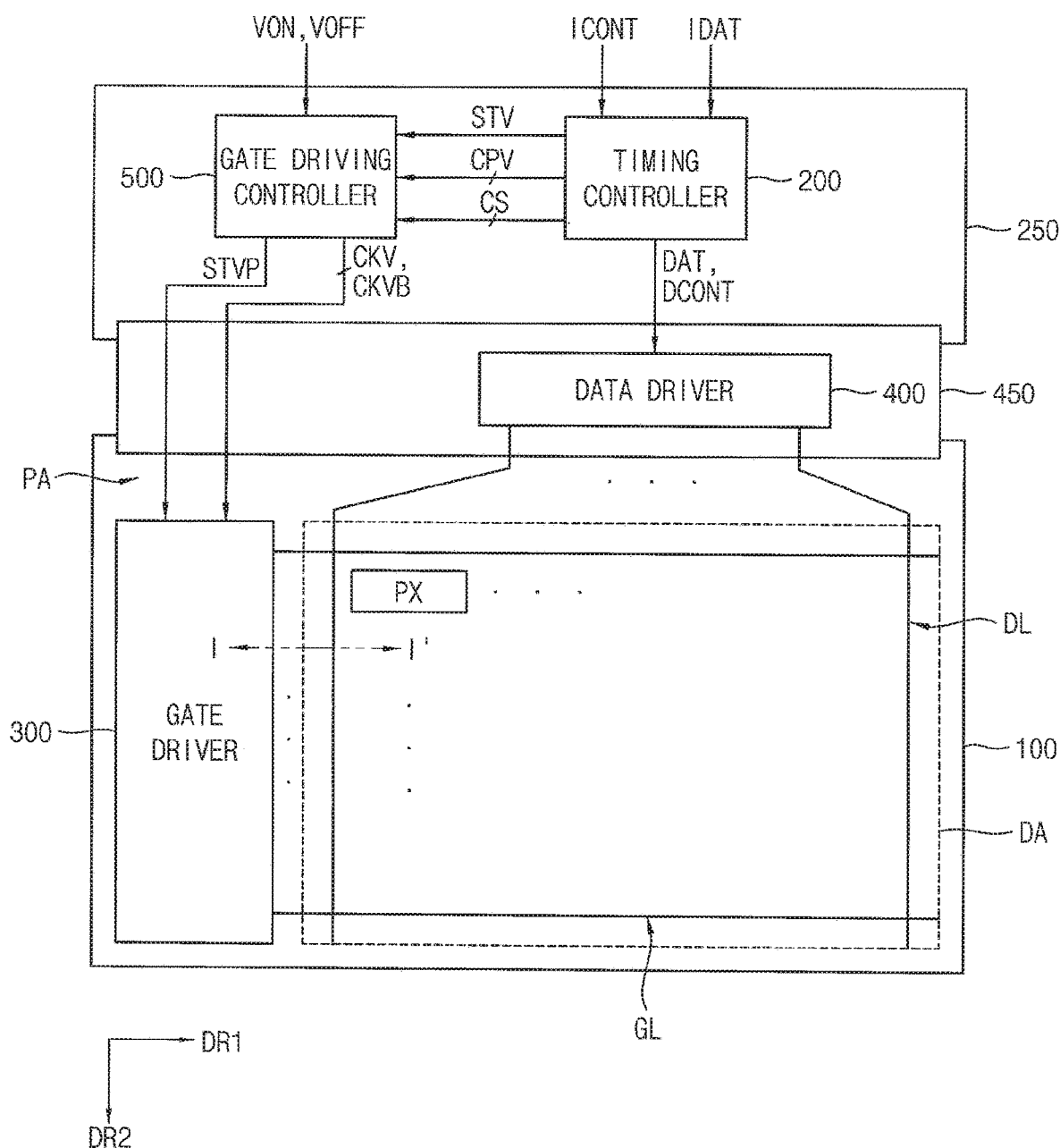
FIG. 1 is a block diagram illustrating a display apparatus according to an exemplary embodiment of the invention.

In the following description, for the purposes of explanation, numerous specific details are set forth in order to provide a thorough understanding of various exemplary embodiments of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z—axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, the inventive concepts will be explained in detail with reference to the accompanying drawings.

FIG. 1 is a block diagram illustrating a display apparatus according to an exemplary embodiment of the invention.

Referring to FIG. 1, the display apparatus 10 may include a display panel 100, a timing controller 200, a gate driver 300, a data driver 400 and a gate driving controller 500. The display apparatus 10 may further include a printed circuit board (PCB) 250 and a flexible PCB (FPCB) 450. The display apparatus 10 may further include a backlight unit BLU, shown in FIG. 2, which provides light to the display panel 100.

The display panel 100 operates (e.g., displays an image) based on output image data DAT. The display panel 100 is connected to a plurality of gate lines GL and a plurality of data lines DL. The gate lines GL may extend in a first direction DR1, and the data lines DL may extend in a second direction DR2 crossing (e.g., substantially perpendicular to) the first direction DR1. The display panel 100 may include a display region DA and a peripheral region PA. The display region DA may include a plurality of pixels PX that are arranged in a matrix form. Each of the pixels PX may be electrically connected to a respective one of the gate lines GL and a respective one of the data lines DL. The peripheral region PA may surround the display region DA.

The timing controller 200 controls operations of the display panel 100, the gate driver 300, the data driver 400 and the gate driving controller 500. The timing controller 200 receives input image data IDAT and an input control signal ICONT from an external device (e.g., a host or a graphic processor). The input image data IDAT may include a plurality of pixel data for the plurality of pixels PX. The input control signal ICONT may include a master clock signal, a data enable signal, a vertical synchronization signal, a horizontal synchronization signal, etc.

The timing controller 200 generates the output image data DAT based on the input image data IDAT. For example, the timing controller 200 may selectively perform an image quality compensation, a spot compensation, an adaptive color correction (ACC), and/or a dynamic capacitance compensation (DCC) on the input image data IDAT to generate the output image data DAT. The timing controller 200 generates a first control signal for controlling the gate driving controller 500 and the gate driver 300 and a second control signal DCONT for controlling the data driver 400 based on the input control signal ICONT. For example, the first control signal may include a vertical start control signal STV, N gate clock control signals CPV, where N is a natural number greater than or equal to two, N charge sharing control signals CS, etc. The second control signal DCONT may include a horizontal start signal, a data clock signal, a polarity control signal, a data load signal, etc.

The gate driving controller 500 generates N gate clock signals CKV and N inversion gate clock signals CKVB based on the N gate clock control signals CPV. As will be described with reference to FIGS. 6 and 13, phases of the N gate clock signals CKV partially overlap with each other, and each of the N inversion gate clock signals CKVB has a phase opposite to that of a respective one of the N gate clock signals CKV. The gate driving controller 500 may generate a vertical start pulse STVP based on the vertical start control signal STV. In addition, the N charge sharing control signals CS may be further used for generating the N gate clock signals CKV and the N inversion gate clock signals CKVB, and a gate on voltage VON and a gate off voltage VOFF that are received from an external circuit (e.g., a power supply or a voltage generator) may be further used for generating the N gate clock signals CKV, the N inversion gate clock signals CKVB and the vertical start pulse STVP. The gate driving controller 500 may be referred to as a power management integrated circuit (PMIC).

The gate driver 300 is connected to the display panel 100 through the gate lines GL. The gate driver 300 generates a plurality of gate signals for driving the display panel 100 based on the N gate clock signals CKV and/or the N inversion gate clock signals CKVB. For example, the gate driver 300 may sequentially provide or apply the gate signals to the display panel 100 through the gate lines GL. In addition, the vertical start pulse STVP may be further used for generating the gate signals.

The data driver 400 is connected to the display panel 100 through the data lines DL. The data driver 400 generates a plurality of data voltages (e.g., analog voltages) for driving the display panel 100 based on the output image data DAT (e.g., digital data) and the second control signal DCONT. For example, the data driver 400 may sequentially provide or apply the data voltages to a plurality of lines (e.g., horizontal lines) in the display panel 100 through the data lines DL.

The gate driver 300 may be an amorphous silicon gate (ASG) circuit which is integrated in a peripheral area PA of the display panel 100. For example, the gate driver 300 may be disposed adjacent to a first side (for example, left short side) in the peripheral area PA.

Figure 2:
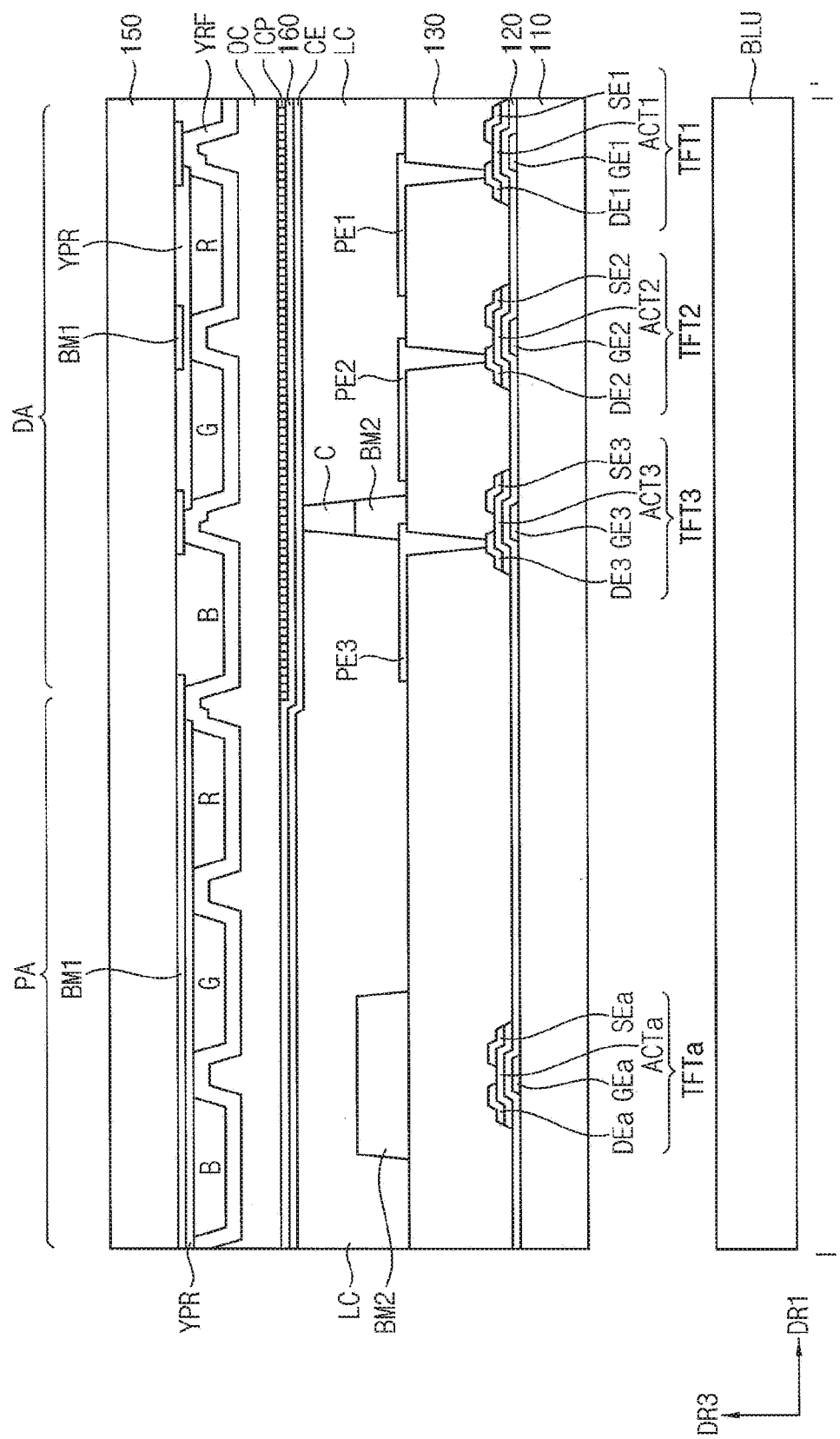
FIG. 2 is a cross-sectional view taken along a line I-I' of FIG. 1.

FIG. 2 is a cross-sectional view taken along a line I-I' of FIG. 1.

Referring to FIG. 2, the display apparatus may include a lower substrate, an upper substrate facing the lower substrate, a liquid crystal layer LC between the lower substrate and the upper substrate. The display apparatus may further include a backlight unit BLU disposed under the lower substrate.

The lower substrate may include a first base substrate 110, a gate pattern, a first insulation layer 120, an active pattern, a data pattern, a second insulation layer 130, a first pixel electrode PE1, a second pixel electrode PE2, a third pixel electrode PE3, a lower light blocking pattern BM2, and a column spacer C.

The display apparatus may include a display area DA in which an image is displayed and a peripheral area PA which is non-display area adjacent to the display area DA.

The first base substrate 110 may be disposed on the backlight unit BLU. The first base substrate 110 may include a transparent insulation substrate. For example, the first base substrate 110 may include a glass substrate, a quartz substrate, a transparent resin substrate, etc. Examples of the transparent resin substrate for the first base substrate 110 may include polyimide-based resin, acryl-based resin, polyacrylate-based resin, polycarbonate-based resin, polyether-based resin, sulfonic acid containing resin, polyethylene-terephthalate-based resin, etc.

The gate pattern may be disposed on the first base substrate 110. The gate pattern may include a first gate electrode GE1, a second gate electrode GE2, a third gate electrode GE3, a gate driving gate electrode GEa, and a signal line, such as a gate line. The gate pattern may include metal. For example, the gate pattern may include aluminum (Al), copper (Cu), titanium (Ti), or the like.

The first gate electrode GE1, the second gate electrode GE2 and the third gate electrode GE3 may be disposed in the display area DA. The gate driving gate electrode GEa may be disposed in the peripheral area PA.

The first insulation layer 120 may be disposed on the first base substrate 110 on which the first gate pattern is disposed. The first insulation layer 120 may be formed using an inorganic insulating material such as silicon oxide, silicon nitride, or metal oxide. The first insulation layer 120 may be uniformly formed on the first base substrate 110 along a profile of the gate pattern. Here, the first insulation layer 120 may have a substantially small thickness, such that a stepped portion may be formed at a portion of the gate pattern. In some exemplary embodiments, the first insulation layer 120 may have a relatively large thickness for sufficiently covering the gate pattern.

The active pattern may be disposed on the first insulation layer 120. The active pattern may include a first active pattern ACT1, a second active pattern ACT2, a third active pattern ACT2, and a gate driving active pattern ACTa. The first active pattern ACT1, the second active pattern ACT2 and the third active pattern ACT3 may be disposed in the display area DA. The gate driving active pattern ACTa may be disposed in the peripheral area PA. The first active pattern ACT1 may overlap the first gate electrode GE1. The second active pattern ACT2 may overlap the second gate electrode GE2. The third active pattern ACT3 may overlap the third gate electrode GE3. The gate driving active pattern ACTa may overlap the gate driving gate electrode GEa.

Each of the first active pattern ACT1, the second active pattern ACT2, the third active pattern ACT3, and the gate driving active pattern ACTa may include a source region, a drain region and a channel region between the source region and the drain region. The active pattern may include a semiconductor layer consisting of amorphous silicon (a-Si: H) and an ohmic contact layer consisting of n+ amorphous silicon (n+ a-Si:H) which makes contact with a source electrode or a drain electrode. In some exemplary embodiments, the active pattern may include a poly silicon semiconductor. In addition, in some exemplary embodiments, the active pattern may include an oxide semiconductor. For example, the oxide semiconductor may include an amorphous oxide including at least one selected from the group consisting of indium (In), zinc (Zn), gallium (Ga), tin (Sn), and hafnium (Hf).

The data pattern may be disposed on the active pattern. The data pattern may include a first source electrode SE1, a first drain electrode DE1, a second source electrode SE2, a second drain electrode SE2, a third source electrode SE3, a third drain electrode DE3, a gate driving source electrode SEa, a gate driving drain electrode DEa and a signal line such as a data line. The data pattern may include a metal, such as aluminum (Al), copper (Cu), titanium (Ti), etc. The active pattern and the data pattern may be formed by an etch-back process and the like.

The first gate electrode GE1, the first active pattern ACT1, the first source electrode SE1, and the first drain electrode DE1 may be included in a first thin film transistor TFT1. The second gate electrode GE2, the second active pattern ACT2, the second source electrode SE2, and the second drain electrode DE2 may be included in a second thin film transistor TFT2. The third gate electrode GE3, the third active pattern ACT3, the third source electrode SE3, and the third drain electrode DE3 may be included in a third thin film transistor TFT3.

The gate driving gate electrode GEa, the gate driving active pattern ACTa, the gate driving source electrode SEa, and the gate driving drain electrode DEa may be included in a gate driving thin film transistor TFTa. The gate driving thin film transistor TFTa may be formed in the peripheral area PA, and may be a thin film transistor constituting an amorphous silicon gate (ASG) circuit (see the description of the gate driving circuit in FIG. 1).

The second insulation layer 130 may be disposed on the first insulation layer 120 on which the first to third thin film transistors TFT1, TFT2, TFT3 and the gate driving thin film transistor TFTa are formed. An upper surface of the second insulating layer 130 may be flat. The second insulating layer 130 may include an organic or inorganic insulating material.

The first pixel electrode PE1, the second pixel electrode PE2, and the third pixel electrode PE3 may be disposed on the second insulation layer 130. The first pixel electrode PE1 may be electrically connected to the first thin film transistor TFT1 through a contact hole in the second insulation later 130. The second pixel electrode PE2 may be electrically connected to the second thin film transistor TFT2 through a contact hole in the second insulation later 130. The third pixel electrode PE3 may be electrically connected to the third thin film transistor TFT3 through a contact hole in the second insulation later 130.

The first pixel electrode PE1, the second pixel electrode PE2, and the third pixel electrode PE3 may include transparent conductive material. For example, the first pixel electrode PE1, the second pixel electrode PE2, and the third pixel electrode PE3 may include indium tin oxide (ITO), indium zinc oxide (IZO), and the like.

The lower light blocking pattern BM2 may be disposed on the second insulation layer 130 on which the first to third pixel electrodes PE1, PE2 and PE3 are disposed. The lower light blocking pattern BM2 may overlap the first to third thin film transistor TFT1, TFT2, and TFT3 and the gate driving thin film transistor TFTa. The lower light blocking pattern BM2 may be disposed at a portion where the light generated in the backlight unit BLU is unnecessary, and may be formed of a red color filter.

The column spacer C may be disposed on the second insulation layer 130 on which the lower light blocking pattern BM2 is formed. The column spacer C may maintain a cell gap or a pressure gap which is an interval between the upper and lower substrates.

The upper substrate may include a second base substrate 150, a light blocking pattern BM1, a blue light blocking pattern YPR, a first color conversion pattern R, a second color conversion pattern G, a blue light passing pattern B, a light recycling filter YRF, an over-coating layer OC, a wire grid polarizer ICP, a capping layer 160, and a common electrode CE.

The second base substrate 150 may be disposed to face the first base substrate 110. The second base substrate 150 may include a transparent insulation layer. For example, the second base substrate 150 may include a glass substrate, a quartz substrate, a transparent resin substrate, etc. Examples of the transparent resin substrate for the second base substrate 150 may include polyimide-based resin, acryl-based resin, polyacrylate-based resin, polycarbonate-based resin, polyether-based resin, sulfonic acid containing resin, polyethyleneterephthalate-based resin, etc.

The light blocking pattern BM1 may be disposed on the second base substrate 150. The light blocking pattern BM1 may define openings in the display area DA which overlap the first to third pixel electrodes PE1, PE2 and PE3, respectively. The light blocking pattern BM1 may be formed in the peripheral area PA, so that the light formed from the backlight unit BLU may not leak out to the peripheral area PA. The light blocking pattern BM1 may overlap the first to third thin film transistors TFT1, TFT2 and TFT3 and the gate driving thin film transistor TFTa.

The light blocking pattern BM1 may include metal. Thus, the light blocking pattern BM1 may be a so-called "metal black matrix" (BM). The light blocking pattern BM1 may include a plurality of layers. For example, the light blocking pattern BM1 may include a first layer disposed on the second base substrate 150 and a second layer disposed on the first layer. Thus, the first layer may be disposed between the first layer and the second layer. Materials of the first layer and the second layer may be configured such that a reflectance of the second layer is higher than that of the first layer. For example, the first layer may include titanium (Ti), and the second layer may include copper (Cu). In addition, the first layer may include MTO (Molybdenum-titanium oxide), and the second layer may include aluminum (Al). In some exemplary embodiments, the light blocking pattern BM1 may include an ITO/Ag/ITO structure.

The blue light blocking pattern YPR may be disposed on the second base substrate 150 on which the light blocking pattern BM1 is disposed to overlap the first pixel electrode PE1 and the second pixel electrode PE2. A wavelength band of transmitted light excluding a wavelength band of blue light can be transmitted through the blue light blocking pattern YPR, and the wavelength band of blue light may be blocked by the blue light blocking pattern YPR. For example, the blue light blocking pattern YPR may be yellow photoresist. In some exemplary embodiments, the blue light blocking pattern YPR may include a positive type of photoresist in which exposed portions are removed by a developer.

Here, the blue light blocking pattern YPR must extend beyond the display area DA to the peripheral area PA. If a negative-type photoresist is used in which an unexposed portion of the blue light blocking pattern YPR is removed by the developer, then it is necessary to perform exposure to the peripheral area PA, so that the exposure area may be increased. However, when the blue light blocking pattern YPR is formed using the above-described positive-type photoresist in the present exemplary embodiment, it is not necessary to expose the peripheral area PA, so that the exposure area may be reduced. Thus, the process efficiency can be improved.

The first color conversion pattern R may be disposed on the blue light blocking pattern YPR to overlap the first pixel electrode PE1. The first color conversion pattern R may be a red color conversion pattern. The first color conversion pattern R may convert blue light provided from the backlight unit BLU to red light. For example, the first color conversion pattern R may include a color conversion material, such as red quantum dot particles and/or red phosphor.

The second color conversion pattern G may be disposed on the blue light blocking pattern YPR to overlap the second pixel electrode PE2. The second color conversion pattern G may be a green color conversion pattern. The second color conversion pattern may convert blue light provided from the backlight unit BLU to green light. For example, the second color conversion pattern G may include a color conversion material, such as green quantum dot particles and/or green phosphor.

The red or green quantum dot may be a material that has a nano-scaled structure and may include several hundred to several thousand atoms. Since the quantum dot is very small in size, a "quantum confinement" effect may occur. The quantum confinement effect may indicate that an energy band gap of an object is increased when the object becomes smaller than nano size. When the light having energy higher than that of the band gap is incident to the quantum dot, the quantum dot may absorb the light and may emit a second light having a specific wavelength and an energy level in the ground state. The wavelength of the emitted second light may have a value corresponding to the band gap. When a size and a composition of the quantum dot are adjusted, the emission property of the quantum dot may be controlled by the quantum confinement.

The composition of the quantum dots is not limited to a specific composition, and any suitable composition may be used. For example, the quantum dot may be a quantum dot of Group II-VI elements, Group III-V elements, Group IV elements, or Group IV-VI elements. The Group II elements may be selected from the group consisting of at least one of zinc, cadmium, and mercury. The group III elements may be selected from the group consisting of at least one of aluminum, gallium, and indium. The Group IV elements may be selected from the group consisting of at least one of silicon, germanium, tin, and lead. The Group V elements may be selected from the group consisting of at least one of nitrogen, phosphorus, and arsenic. The Group VI elements may be selected from the group consisting of at least one of sulfur, selenium, and tellurium.

The red phosphor may be one of (Ca, Sr, Ba)S, (Ca, Sr, Ba)$_2$Si$_5$N$_8$, CaAlSiN$_3$, CaMoO$_4$ and Eu$_2$Si$_5$N$_8$, but is not limited thereto.

The green phosphor may be at least one selected from the group consisting of yttrium aluminum garnet (YAG), (Ca, Sr, Ba)$_2$SiO$_4$, SrGa$_2$S$_4$, barium magnesium aluminate (BAM), alpha-SiAlON($\alpha$-SiAlON), beta-SiAlON($\beta$-SiAlON), Ca$_3$Sc$_2$Si$_3$O$_{12}$, Tb$_3$Al$_5$O$_{12}$, BaSiO$_4$, CaAlSiON, and (Sr1-xBax)Si$_2$O$_2$N$_2$, but is not limited thereto.

The blue light passing pattern B may be disposed on the second base substrate 150 on which the light blocking pattern BM1 is disposed. The blue light passing pattern B may include scattering particles that change the traveling direction of the blue light without changing the wavelength of the blue light provided from the backlight unit BLU. The scattering particles may be particles of TiO2 or the like, and the size of the scattering particle may be similar to size of the red quantum dot particle or the green quantum dot particle. In addition, the blue light passing pattern B may further include a blue pigment for converting light passing therethrough to blue light.

The light recycling filter YRF may be disposed on the first color conversion pattern R, the second color conversion pattern G and the blue light passing pattern B. The light recycling filter YRF may be a yellow light recycling filter. The light recycling filter YRF may reflect again light which is formed from the backlight unit BLU and is reflected toward the liquid crystal layer LC while passing the blue light passing pattern B, the first color conversion pattern R, the second color conversion pattern G, and the blue light blocking filter YPR, so that brightness of the display apparatus may be improved. For example, the light recycling filter YRF may be formed by alternately laminating at least two layers with different refractive indices.

The over-coating layer OC may be disposed on the light recycling filter YRF. The over-coating layer OC may include inorganic or organic insulation material. For example, a top surface of the over-coating layer OC is planar and may be formed using an acrylic-based epoxy material.

The wire grid polarizer ICP may be disposed on the over-coating layer OC. The wire grid polarizer ICP may be disposed in the display area DA. The wire grid polarizer ICP may include metal, and include a plurality of fine lines extending in one direction, which are formed of metal and are arranged at regular intervals. The fine lines may have a pitch of about 50 nm (nanometers) to 150 nm. The pitch refers to sum of a width of one fine line and a distance between adjacent fine lines.

The capping layer 160 may be disposed on the wire grid polarizer ICP. The capping layer 160 may be formed using an inorganic insulating material, such as silicon oxide, silicon nitride, or a metal oxide.

The common electrode CE may be disposed on the capping layer 160. The common electrode CE may include a transparent conductive material. For example, the common electrode CE may include indium tin oxide (ITO), indium zinc oxide (IZO), etc.

The liquid crystal layer LC may be disposed between the first to third pixel electrodes PE1, PE2 and PE3 and the common electrode CE. The liquid crystal layer LC may include liquid crystal molecules having optical anisotropy. The liquid crystal molecules are driven by electric field, so that an image is displayed by passing or blocking light through the liquid crystal layer LC.

In addition, the light blocking pattern BM1 may be disposed on the second base substrate 150 in the peripheral area PA, the first color conversion pattern R, the second color conversion pattern G and the blue light passing pattern B may be disposed on the light blocking pattern BM1. Here, the first and second color conversion patterns R and G and the blue light passing pattern B are not used in a pixel structure, but may be a dummy pattern formed by a manufacturing process.

For example, in manufacturing the display apparatus, the first color conversion pattern R, the second color conversion pattern G, and the blue light passing pattern B may be formed over most of the second base substrate 150 up to a portion of the peripheral area PA as well as the display area DA. The first color conversion pattern R, the second color conversion pattern G, and the blue light passing pattern B in the peripheral area PA may be formed by characteristics of a manufacturing apparatus or may be formed to serve as a dam.

In addition, the first color conversion pattern R, the second color conversion pattern G, and the blue light passing pattern B are formed in the peripheral area PA, so that a cell gap between the upper substrate and the lower substrate of the display apparatus in the peripheral area PA is can be uniformly ensured as compared with a cell gap in the display area DA.

As the first color conversion pattern R, the second color conversion pattern G, and the blue light passing pattern B are formed in the peripheral area PA, the cell gap between the upper substrate and the lower substrate of the display apparatus can be uniformly ensured as compared with the cell gap in the display area DA.

The backlight unit BLU may be disposed below the first base substrate 100 and may provide light toward the liquid crystal layer LC. Specifically, the backlight unit BLU may include a light source that generates light having a first wavelength and a light guide plate (not shown) that receives the light generated from the light source and guides the light toward the liquid crystal layer LC. The first wavelength may be from about 400 nm to about 500 nm and the light may be blue light. Thus, the backlight unit BLU may generate blue light and provide the blue light toward the liquid crystal layer LC. For example, the backlight unit BLU may include a blue light emitting diode as the light source.

Figure 3A:
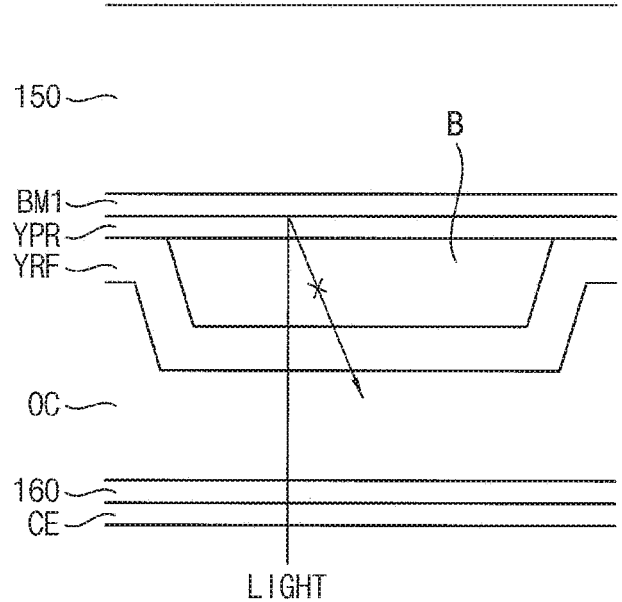
FIG. 3A is a cross-sectional view illustrating a path of light provided from a backlight unit BLU in an upper substrate in a peripheral area PA of the display apparatus of FIG. 2.

FIG. 3A is a cross-sectional view illustrating a path of light provided from a backlight unit BLU in an upper substrate in a peripheral area PA of the display apparatus of FIG. 2.

Referring to FIGS. 2 and 3A, in the peripheral area PA, the blue light LIGHT formed from the backlight unit BLU may pass the blue light passing pattern B and the blue light blocking pattern YPR, and then may be reflected on the light blocking pattern BM1. Here, the blue light may pass the blue light passing pattern B, and may mostly be absorbed by the blue light blocking pattern YPR while passing the blue light blocking pattern YPR. In addition, after being reflected by the light blocking pattern BM1, the blue light may again be absorbed by the blue light blocking pattern YPR. Accordingly, the amount of blue light reflected by the light blocking pattern BM1 is very small. As a result, it becomes difficult for blue light to reach the gate driving active pattern ACTa of the gate driving thin film transistor TFTa, so that it is possible to prevent a problem that light is incident on the gate driving active pattern ACTa and the semiconductor characteristics are degraded.

FIG. 3A is a cross-sectional view illustrating a path of light provided from a backlight unit BLU in an upper substrate in a peripheral area PA of the display apparatus of FIG. 2.

Referring to FIGS. 2 and 3A, in the display area DA, the blue light LIGHT generated from the backlight unit BLU can be viewed by the user after passing through the blue light passing pattern B. Here, the blue light LIGHT can be reflected on the light blocking patterns BM1, and reflected by the light recycling filter YRF to be visible to the user, or scattered by the scattering particles in the blue light passing pattern B. Accordingly, light efficiency can be improved within the display area.

Thus, the blue light passing pattern B and the blue light blocking pattern YPR do not overlap each other in the display area DA, and the blue light passing pattern B and the blue light blocking pattern YPR overlap each other in the peripheral area PA, so that light efficiency is improved in the display area, and degradation of the characteristics of the gate driving thin film transistor TFTa can be prevented in the peripheral area PA.

In addition, since a lower surface of the light blocking pattern BM1, which is the second layer of the light blocking pattern BM1, includes metal with high reflectance, light is recycled by using reflection on the light blocking pattern BM1 to improve the light efficiency in the display area DA, and at the same time, degradation of the characteristics of the gate driving thin film transistor TFTa can be prevented in the peripheral area PA by suppression of reflection by the blue light blocking pattern YPR.

In addition, the first color conversion pattern R, the second color conversion pattern G, and the blue light passing pattern B are formed in the peripheral area PA, so that a cell gap between the upper substrate and the lower substrate of the display apparatus in the peripheral area PA is can be uniformly ensured as compared with a cell gap in the display area DA.

Figure 4:
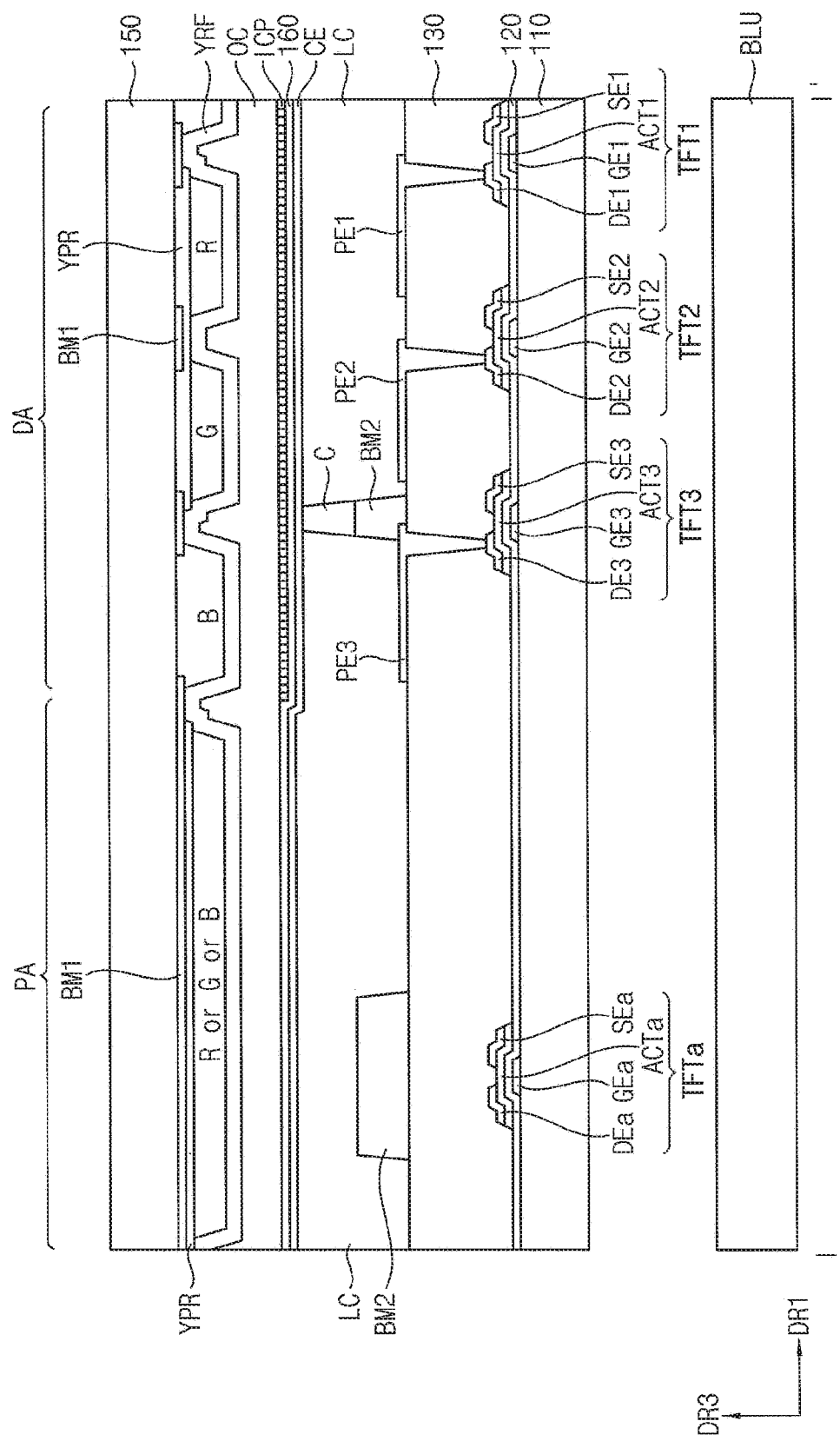
FIG. 4 is a cross-sectional view according to an exemplary embodiment of the invention.

FIG. 4 is a cross-sectional view according to an exemplary embodiment of the inventive concepts.

Figure 3B:
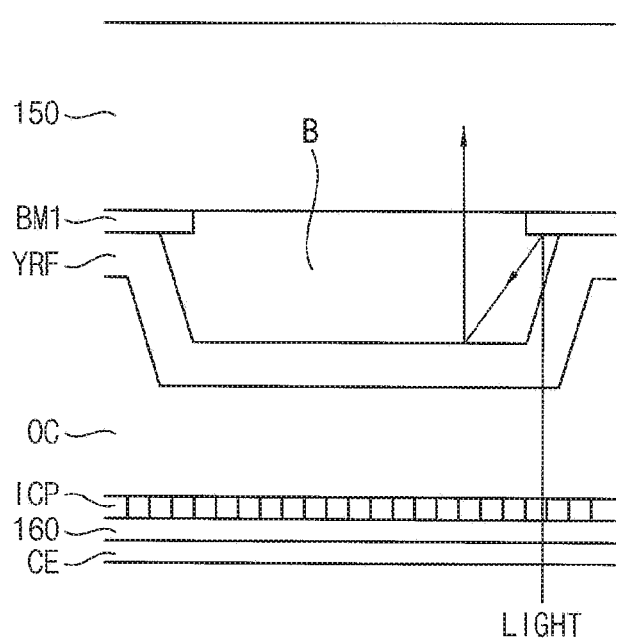
FIG. 3B is a cross-sectional view illustrating a path of light provided from the backlight unit BLU in the upper substrate in a display area DA of the display apparatus of FIG. 2.

Referring to FIG. 4, the display apparatus may be substantially the same as the display apparatus of FIGS. 1 to 3, except for a shape of a peripheral area PA. Therefore, repeated description will be omitted.

The display apparatus may include a display area DA, and a peripheral area PA, which is non-display area. The display apparatus may include a first base substrate 110, a gate pattern, a first insulation layer 120, an active pattern, a data pattern, a second insulation layer 130, a first pixel electrode PE1, a second pixel electrode PE2, a third pixel electrode PE3, a lower light blocking pattern BM2, a column spacer C, a liquid crystal layer LC, a common electrode CE, a capping layer 160, a wire grid polarizer ICP, an over-coating layer OC, a light recycling filter YRF, a first color conversion pattern R, a second color conversion pattern G, a blue light passing pattern B, a blue light blocking pattern YPR, a light blocking pattern BM1, and a second base substrate 150.

The first light blocking pattern BM1 may be disposed on the second base substrate 150 in the peripheral area PA. The blue light blocking pattern YPR may be disposed on the first light blocking pattern BM1.

The first color conversion pattern R, the second color conversion pattern G, or the blue light passing pattern B may be disposed on the blue light blocking pattern YPR. The first color conversion pattern R, the second color conversion pattern G, or the blue light passing pattern B in the peripheral area PA is a dummy pattern, and a cell gap between the upper substrate and the lower substrate in the peripheral area PA can be uniformly ensured, as compared with a cell cap in the display area DA due to the dummy pattern.

In this exemplary embodiment, unlike the display apparatus of FIGS. 1 to 4, arrangement of the first color conversion pattern R, the second color conversion pattern G, and the blue light passing pattern B in the peripheral area PA is different from that of in the display area DA.

Figure 5:
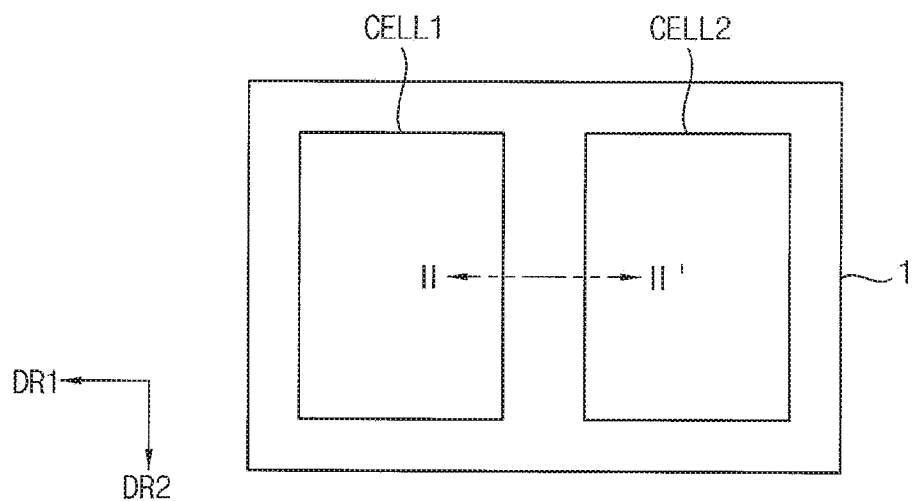
FIG. 5 and FIG. 6 are a plan view and a cross-sectional view respectively illustrating a portion of method of manufacturing a display apparatus according to an exemplary embodiment of the invention
Figure 6:
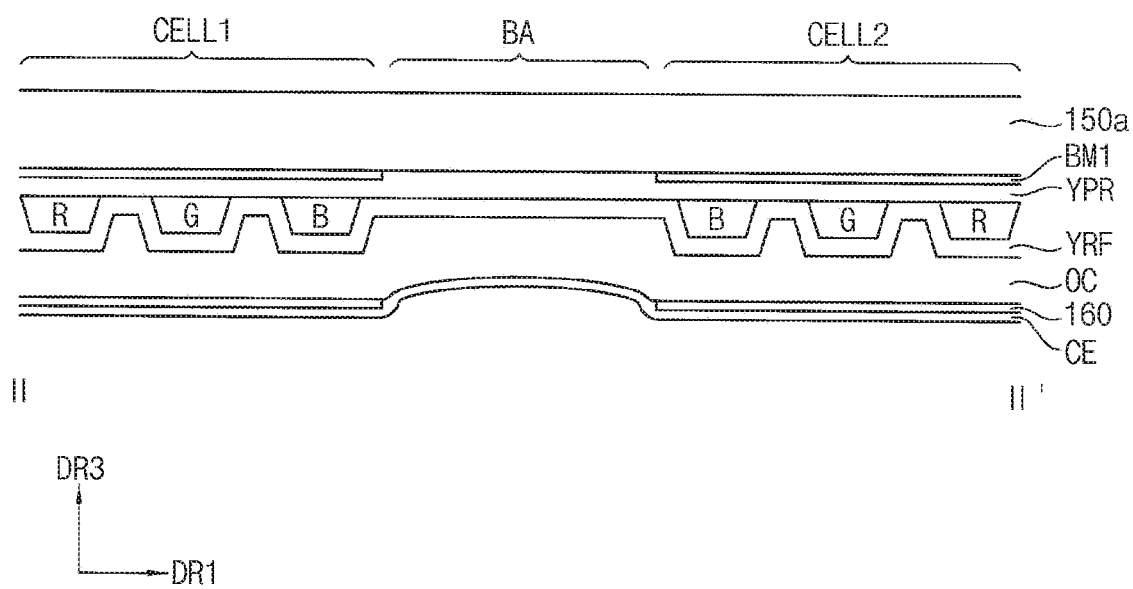

FIG. 5 and FIG. 6 are a plan view and a cross-sectional view respectively illustrating a portion of method of manufacturing a display apparatus according to an exemplary embodiment of the inventive concepts.

Referring to FIGS. 5 and 6, a light blocking pattern BM1 may be formed on a second mother base substrate 150a. A metal layer may be formed on the second mother base substrate 150a, and then the light blocking pattern BM1 may be obtained by patterning the metal layer using a photolithography process or an etching process using an additional etching mask.

A blue light blocking pattern YPR may be formed on the second mother base substrate 150a on which the light the light blocking pattern BM1 is formed. The blue light blocking pattern YPR may be formed using yellow photoresist. For example, a yellow photoresist layer may be formed on the second mother base substrate 150a on which the light blocking pattern BM1 is formed, and then exposed and developed.

Here, the yellow photoresist layer may include a positive-type photoresist. Accordingly, after the yellow photoresist layer is formed on entire of the second mother base substrate 150a, the exposure is performed only on the display areas (see DA in FIG. 2) of a first cell CELL1 and a second cell CELL2. It is not necessary to expose a peripheral region (see PA in FIG. 2) and a region BA between the first cell CELL1 and the second cell CELL2. Accordingly, the exposure area is minimized and the efficiency of the exposure process can be improved. The first cell CELL1 and the second cell CELL2 are separated from each other in a final process and each of the cells correspond to one final product. For reference, the portions corresponding to the first and second cells shown in the cross-sectional view of FIG. 6 is corresponding to the peripheral area (refers to PA in FIG. 2) of the display apparatus.

A first color conversion pattern R, a second color conversion pattern G, and a blue light passing pattern B may be formed on the blue light blocking pattern YPR. Thereafter, a light recycling filter YRF may be formed on the blue light blocking pattern YPR. An over-coating layer OC may be formed on the light recycling filter YRF. A wire grid polarizer (refers to ICP of FIG. 2) may be formed on the over-coating layer OC, and a capping layer 160 may be formed on the over-coating layer OC. A common electrode CE may be formed on the capping layer 160. Accordingly, the upper substrate may be manufactured.

Here, in the region BA between the first cell CELL1 and the second cell CELL2, the second mother base substrate 150a, the blue light blocking pattern YPR, the light recycling filter YRF, and the over-coating layer OC may be formed in order.

Figure 7A:
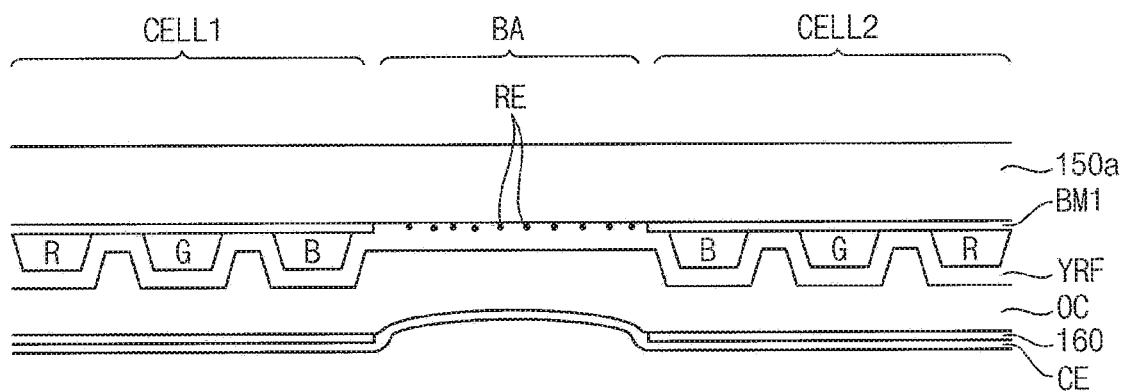
FIG. 7A and FIG. 7B are cross-sectional views comparing an upper substrate in a method of manufacturing a display apparatus according to a comparative example of the prior art and an upper substrate in a method of manufacturing a display apparatus according to an exemplary embodiment of the invention
Figure 7B:
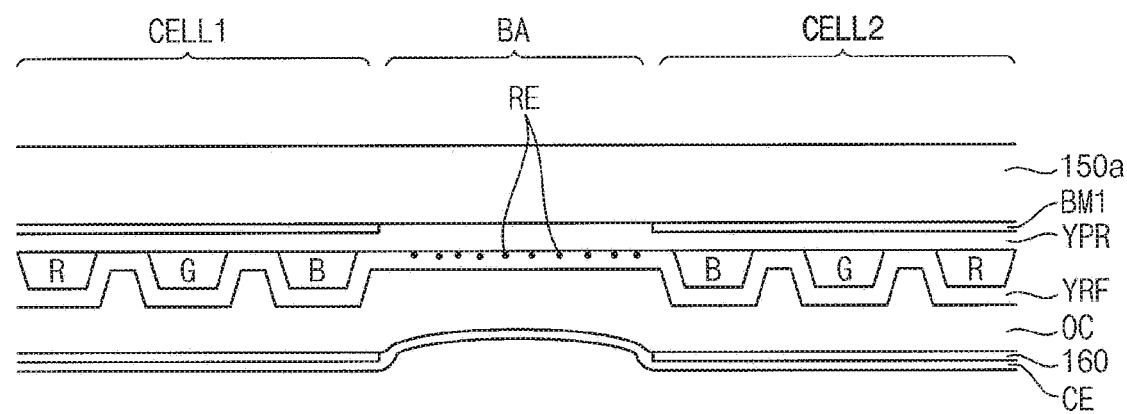

FIGS. 7A and 7B are cross-sectional views comparing an upper substrate in a method of manufacturing a display apparatus according to a comparative example of the prior art and an upper substrate in a method of manufacturing a display apparatus according to an exemplary embodiment of the inventive concepts.

Referring to FIG. 7A, in the method of manufacturing the display apparatus according to the comparative example of the prior art, in a region BA between a first cell CELL1 and a second cell CELL2, a light recycling filter YRF may be formed on a second mother base substrate 150a.

Accordingly, in a process of forming a first color conversion pattern R, a second color conversion pattern G and a blue light passing pattern B on the second mother base substrate 150a, a plurality of residual materials RE may be formed in the region BA).

When the light recycling filter YRF is formed on the second mother base substrate 150a while the residual materials RE remain, adhesion between the light recycling filter YRF and the second mother base substrate 150a is reduced. Therefore, the light recycling filter YRF may be separated from the second mother base substrate 150a in the region BA, and it may cause defects in the first and second cells CELL1 and CELL2. Especially, when the first and second color conversion patterns R and G include quantum dots, defects due to the residual material RE may increase.

Referring to FIG. 7B, in the method of manufacturing the display apparatus according to an exemplary embodiment of the inventive concepts, in a region BA between a first cell CELL1 and a second cell CELL2, a light recycling filter YRF may be formed on a second mother base substrate 150 on which a blue light blocking pattern YPR is formed.

Accordingly, a plurality of residual materials RE formed in the process of forming the first color conversion pattern R, the second color conversion pattern G, and the blue light passing pattern B may remain on the blue light blocking pattern YPR. As a result, the residual materials RE are positioned between the blue light blocking pattern YPR and the light recycling filter YRF. The blue light blocking pattern YPR is a photoresist material which has a good adhesion to the light recycling filter YRF, which is an inorganic film, so that separation between the blue light blocking pattern YPR and light recycling filter YRF does not occur even if the residual material RE remains therebetween. This is because if the residual material RE is located between the inorganic film and the inorganic film, separation may occur, but if it is disposed between the inorganic film and the organic film as in the present embodiment, the separation may be prevented.

Figure 8:
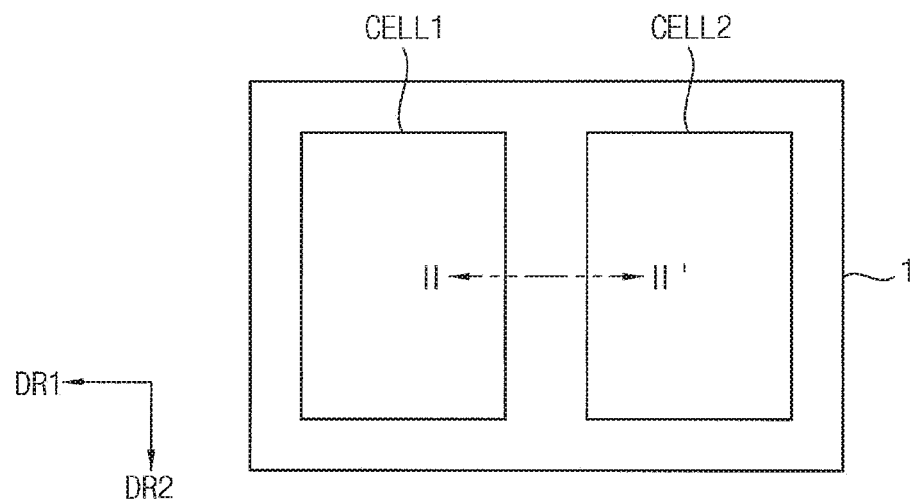
FIG. 8 and FIG. 9 are a plan view and a cross-sectional view illustrating a remainder of the method of manufacturing the display apparatus according to FIG. 5 and FIG. 6, respectively.
Figure 9:
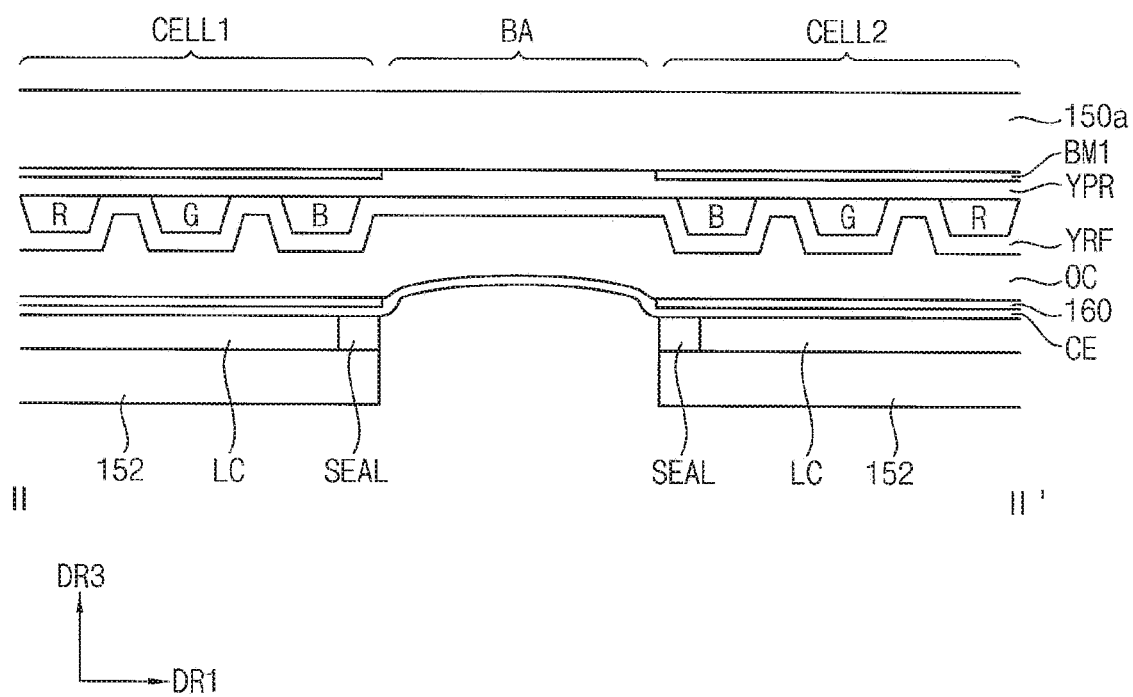

FIGS. 8 and 9 are a plan view and a cross-sectional view illustrating a remainder of the method of manufacturing the display apparatus according to FIGS. 5 and 6.

Referring to FIGS. 8 and 9, a lower substrate 152 and a liquid crystal layer LC may be formed corresponding to the first cell CELL1 and the second cell CELL2. The lower substrate 152 may be positioned to face the upper substrate, and then the liquid crystal layer LC may be formed between the upper substrate and the lower substrate 152. The liquid crystal layer LC may be sealed by a sealing member SEAL.

Then, the second mother base substrate 150a and layers thereon in the region BA may be cut (cutting process) to separate the first cell CELL1 and the second cell CELL2. Thus, a display apparatus corresponding to the first cell region CELL1 and a display apparatus corresponding to the second cell region CELL2 can be formed.

In addition, in some exemplary embodiments, the upper substrate may be first cut into individual cells, and then the lower substrate 152 and the liquid crystal layer LC may be formed.

Figure 10:
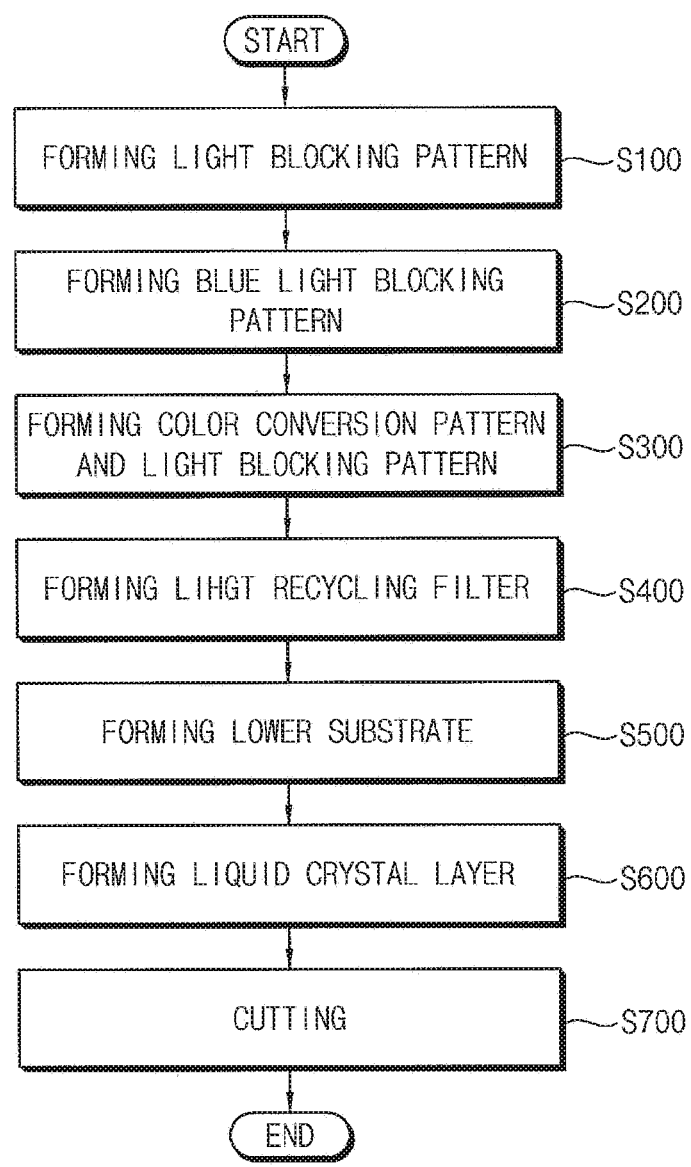
FIG. 10 is a flowchart illustrating a method of manufacturing a display apparatus according to an exemplary embodiment of the invention

FIG. 10 is a flowchart illustrating a method of manufacturing a display apparatus according to an exemplary embodiment of the inventive concepts.

Referring to FIG. 10, according to the method of manufacturing the display apparatus, a light blocking pattern may be formed on a mother base substrate including a first cell region and a second cell region (forming light blocking pattern (S100)).

Then, a blue light blocking pattern may be formed on a first cell region, a second cell region, and a region between the first cell region and the second cell region on the mother base substrate on which the light blocking pattern is formed (forming blue light blocking pattern (S200)).

Then, a first color conversion pattern, a second color conversion pattern and a blue light blocking pattern may be formed on the blue light blocking pattern (forming pattern (S300)).

Then, a light recycling filter may be formed on the blue light blocking pattern, the first and second color conversion patterns, and the blue light passing pattern (forming light recycling filter (S400)).

Then, a lower substrate including a thin film transistor is formed and corresponds to each of the first and second cell regions (forming lower substrate (S500)).

Then, a liquid crystal layer may be formed between the mother base substrate and the lower substrate corresponding to each of the first and second cell regions (forming liquid crystal layer (S600)).

Then, the region between the first cell region and the second cell region may be cut off to separate the first cell region and the second cell region (cutting (S700)). Accordingly, a display apparatus may be manufactured.

According to the exemplary embodiments of the inventive concepts, a display apparatus includes a first base substrate, a second base substrate facing the first base substrate, and a liquid crystal layer disposed between the first base substrate and the second base substrate. In a display area in which an image is displayed, the display apparatus includes first, second, and third thin film transistors disposed on the first base substrate; first, second, and third pixel electrodes disposed on the first base substrate and electrically connected to the first, second, and third thin film transistors, respectively; a light blocking pattern disposed on the second base substrate and having openings which overlap the first to third pixel electrodes; a blue light blocking pattern disposed on the second base substrate and overlapping the first and second pixel electrodes; and first and second color conversion patterns disposed on the blue light blocking pattern, and overlapped with the first and second pixel electrodes, respectively. In a peripheral area, which is a non-display area adjacent to the display area, the display apparatus includes a gate driving thin film transistor disposed on the first base substrate, the light blocking pattern disposed on the second base substrate and overlapping the gate driving thin film transistor, the blue light blocking pattern disposed on the light blocking pattern, and a blue light passing pattern disposed on the blue light blocking pattern.

The blue light passing pattern and the blue light blocking pattern do not overlap each other in the display area, and the blue light passing pattern and the blue light blocking pattern overlap each other in the peripheral area, so that the light efficiency is improved in the display area, and the characteristics degradation of the gate driving thin film transistor can be prevented in the peripheral area.

In addition, since a lower surface of the light blocking pattern which is the second layer of the light blocking pattern includes metal with high reflectance, light is recycled by using reflection by the light blocking pattern to improve the light efficiency in the display area, and at the same time, degradation of the characteristics of the gate driving thin film transistor can be prevented in the peripheral area by suppression of reflection by the blue light blocking pattern.

In addition, the first color conversion pattern, the second color conversion pattern, and the blue light passing pattern are formed in the peripheral area, so that a cell gap between the upper substrate and the lower substrate of the display apparatus in the peripheral area is can be uniformly ensured as compared with a cell gap in the display area.

In addition, when the blue light blocking pattern is formed using the above-described positive type photoresist in the present example embodiment, it is not necessary to expose the peripheral area, so that the exposure area may be reduced. Thus, the process efficiency can be improved.

In addition, a plurality of residual materials RE formed in the process of forming the first color conversion pattern, the second color conversion pattern and the blue light passing pattern may remain on the blue light blocking pattern. As a result, the residual materials are positioned between the blue light blocking pattern and the light recycling filter. The blue light blocking pattern is a photoresist material which has a good adhesion to the light recycling filter which is an inorganic film, so that separation between the blue light blocking pattern and light recycling filter does not occur even if the residual material remains therebetween. Accordingly, it is possible to prevent occurrence of defects.

Although certain exemplary embodiments have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display apparatus, comprising:
a first base substrate;
a second base substrate facing the first base substrate; and
a display layer disposed between the first base substrate and the second base substrate,
wherein:
in a display area in which an image is displayed, the display apparatus comprises:
first, second, and third thin film transistors disposed on the first base substrate;
first, second, and third pixel electrodes disposed on the first base substrate and electrically connected to the first, second, and third thin film transistors, respectively;
an upper light blocking pattern disposed on the second base substrate and having openings which overlap the first to third pixel electrodes;
a blue light blocking pattern disposed on the second base substrate and overlapping the first and second pixel electrodes; and
first and second color conversion patterns disposed on the blue light blocking pattern, and overlapped with the first and second pixel electrodes, respectively;
in a peripheral area, which is a non-display area adjacent to the display area, the display apparatus comprises:
a gate driving thin film transistor disposed on the first base substrate;
an insulating layer disposed on the first base substrate and covering the gate driving thin film transistor;
the upper light blocking pattern disposed on the second base substrate and overlapping the gate driving thin film transistor;
the blue light blocking pattern disposed on the upper light blocking pattern;
a blue light passing pattern disposed on the blue light blocking pattern; and
a lower light blocking pattern disposed on the insulating layer and between the first base substrate and the second base substrate and overlapping the gate driving thin film transistor; and
the upper light blocking pattern is disposed continuously in the peripheral area above the gate driving thin film transistor.

2. The display apparatus of claim 1, wherein the upper light blocking pattern comprises metal.

3. The display apparatus of claim 2, wherein:
the upper light blocking pattern comprises a first layer disposed on the second base substrate and a second layer disposed on the first layer;
the first layer is disposed between the second layer and the second base substrate; and
a reflectance of the second layer is greater than that of the first layer.

4. The display apparatus of claim 1, further comprising a backlight unit disposed under the first base substrate to provide a blue light in a direction toward the display layer.

5. The display apparatus of claim 4, wherein:
the blue light passing pattern is a transparent pattern or a blue color conversion pattern which changes light passing therethough to blue light;
the first color conversion pattern comprises red quantum dot particles and/or red phosphor which changes light passing therethough to red light; and
the second color conversion pattern comprises green quantum dot particles and/or green phosphor which changes light passing therethough to green light.

6. The display apparatus of claim 5, wherein in the peripheral area, the display apparatus further comprises the first color conversion pattern on the blue light blocking pattern; and the second color conversion pattern disposed on the blue light blocking pattern.

7. The display apparatus of claim 1, wherein the blue light blocking pattern overlaps the gate driving thin film transistor in the peripheral area.

8. The display apparatus of claim 1, wherein the lower light blocking pattern overlaps the first to third thin film transistors in the display area.

9. The display apparatus of claim 8, wherein the lower light blocking pattern is red or green photoresist.

10. The display apparatus of claim 1, wherein the blue light blocking pattern is a yellow color filter.

11. The display apparatus of claim 10, wherein the blue light blocking pattern comprises positive-type photoresist.

12. The display apparatus of claim 1, wherein the gate driving thin film transistor and the first to third thin film transistors are formed from a same layer.

13. The display apparatus of claim 1, further comprising a light recycling filter disposed between the first color conversion pattern and the display layer, between the second color conversion pattern and the display layer, and between the blue light passing pattern and the display layer.

14. The display apparatus of claim 13, further comprising a wire grid polarizer disposed between the light recycling filter and the display layer.

* * * * *